United States Patent
Uemoto et al.

(10) Patent No.: US 7,381,362 B2
(45) Date of Patent: Jun. 3, 2008

(54) PRODUCTION METHOD FOR CERAMIC POROUS MATERIAL

(75) Inventors: Hideo Uemoto, Hadano (JP); Kazuhide Kawai, Nishio (JP); Shunzo Shimai, Tougane (JP); Takashi Matsuyama, Sagamihara (JP)

(73) Assignee: Covalent Materials Corporation, Tokyo (JP)

( * ) Notice: Subject to any disclaimer, the term of this patent is extended or adjusted under 35 U.S.C. 154(b) by 205 days.

(21) Appl. No.: 11/038,128

(22) Filed: Jan. 21, 2005

(65) Prior Publication Data

US 2005/0200055 A1     Sep. 15, 2005

Related U.S. Application Data

(63) Continuation of application No. 10/184,804, filed on Jul. 1, 2002.

(30) Foreign Application Priority Data

Jul. 2, 2001     (JP)     ............................ 2001-201350

(51) Int. Cl.
  *B29C 71/02*     (2006.01)

(52) U.S. Cl. ........................... 264/628; 264/42; 264/43
(58) Field of Classification Search .................. 264/42, 264/43, 628
See application file for complete search history.

(56) References Cited

U.S. PATENT DOCUMENTS

| | | | |
|---|---|---|---|
| 5,082,607 A | 1/1992 | Tange et al. | |
| 5,171,720 A | 12/1992 | Kawakami | |

*Primary Examiner*—Steven P. Griffin
*Assistant Examiner*—Russell J Kemmerle
(74) *Attorney, Agent, or Firm*—Oblon, Spivak, McClelland, Maier & Neustadt, P.C.

(57) ABSTRACT

To provide a method for producing a ceramic porous material which has a high strength, though it has a high porosity, and which is excellent in permeability without dust generation. In a ceramic porous material having a three-dimensional mesh-like skeleton structure with a large number of substantially spherical adjacent cells communicating with each other via communication holes, the crystal particle size at the rim of each communication hole in the skeleton structure is provided substantially equal to the crystal particle size in the other parts.

14 Claims, 1 Drawing Sheet

US 7,381,362 B2

PRODUCTION METHOD FOR CERAMIC POROUS MATERIAL

BACKGROUND OF THE INVENTION

1. Field of the Invention

The present invention relates to a ceramic porous material having a bubble-like appearance to be used as a filter, a bubbler, a gas supplying member, a semiconductor producing device member, an artificial bone, a cell culturing supporter, an artificial organ, a catalyst supporter, or the like, and a production method therefor.

2. Description of the Related Art

Conventionally, as a ceramic porous material of this kind, one having a three-dimensional mesh-like skeleton structure with a large number of substantially spherical adjacent cells (pores) communicating with each other via communication holes has been known (see the official gazette of the Japanese Patent Laid Open Application (JP-A) No. 4-202071 (U.S. Pat. No. 2,506,502).

The ceramic porous material is produced by preparing a slurry by dispersing or dissolving in a solvent a ceramic powder and an organic substance to be hardened by the cross-linking polymerization, adding a cross-linking agent to the slurry, molding and hardening (gellation molding) in an agitated and bubbled state, drying the compact and baking (fireing, sintering).

However, according to the conventional ceramic porous material, problems are involved in that the mechanical strength is low, dusts (particles) are generated, and the transmissivity is poor.

In order to find the cause of the problems, the periphery of the communication holes in the skeleton structure was observed with a scanning type electron microscope so that an abnormal form of crystal particles forming the rim of the communication holes was observed.

That is, at the rim of the communication holes, single particles of a cockscomb shape and a cactus shape were observed. Moreover, the fact that minute holes of the size equivalent to the crystal particle size, communicating the adjacent pores were found at the rim part of the communication holes and the growth of the crystal particles are restrained at the rim of the communication holes was found.

It can easily be assumed that the above-mentioned crystal particle growth abnormal part became the breakage starting point when the external force was applied to the ceramic porous material so as to cause stress concentration, and furthermore, the cockscomb shaped and cactus shaped parts were peeled off so as to generate dusts.

Accordingly, it is considered that the abnormal form of the crystal particle growth forming the rim of the communication holes is generated in the production process of the ceramic porous material.

That is, the cells of the slurry stage are formed by the liquid medium containing the ceramic powder, and in most cases by the aqueous slurry. The slurry before hardening is moved by the surface tension and parts between the adjacent cells are partially thinned and broken so as to form the communication holes. The communication hole rims linking the cells accordingly formed are of a sharp shape because they are broken after thinning and the viscosity of the slurry at the time of breaking is high and the flowability after film breakage to rounding the rims is low. Or in the case of forming the communication holes by breaking the thin film at the time of expansion and shrinkage of the air in the cells due to the temperature change after drying, or the like, the small pieces of the dried substances generated by the breakage can be adhered on the wall surface of the cells.

The average particle sizes of the crystal particles at the rim of the communication holes of the alumina ceramic porous material of the 80% porosity (baked at 1,600° C. for 2 hours in the air), at a position 2 μm away from the rim, and at a position 4 μm away from the rim were 0.80 μm, 1.67 μm, and 1.81 μm, respectively, and it was 8.52 μm at a position 100 μm away from the rim. The average particle sizes of the crystal particles at the rim of the communication holes of the hydroxyl apatite porous material of the 75% porosity (baked at 1,200° C. for 2 hours in the air), at a position 0.5 μm away from the rim, at a position 1 μm away from the rim, and at a position 1.5 μm away from the rim were 0.42 μm, 0.5 μm, and 0.55 μm, and 0.62 μm, respectively. Moreover, the average particle sizes of the crystal particles at the rim of the communication holes of the silicon carbide porous material of the 75% porosity (baked at 2300° C. for 2 hours in the reduced pressure argon gas atmosphere), at a position 2 μm away from the rim, and at a position 4 μm away from the rim were 0.49 μm, 4.38 μm, and 4.38 μm, respectively.

SUMMARY OF THE INVENTION

Accordingly, an object of the present invention is to provide a production method for a ceramic porous material having a high strength for its high porosity and the excellent transmissivity without the risk of generation of dusts.

A first aspect of the production method for a ceramic porous material is a production method for a ceramic porous material comprising the steps of preparing a bubble-like slurry by mixing and whipping a ceramic powder, a liquid medium, a dispersing agent, forming agent if necessary and a gellation main agent, adding and mixing a gellation sub agent to the bubble-like slurry, pouring into a mold for obtaining a gellation product, drying the gellation product for having a compact having a three dimensional mesh-like skeleton structure with a large number of substantially spherical adjacent cells communicating with each other via communication holes, and sintering or fireing the compact directly, or temporarily baking (calcinating) the same before sintering or fireing for obtaining a sintered or fired product, wherein the rim of each communication hole in the compact, the temporarily baked product or the sintered or fired product is eliminated mechanically.

A second aspect of a production method for a ceramic porous material is a production method for a ceramic porous material comprising the steps of preparing a bubble-like slurry by mixing and whipping a ceramic powder, a liquid medium, a dispersing agent if necessary, a forming agent and a gellation main agent, adding and mixing a gellation sub agent to the bubble-like slurry, pouring into a mold for obtaining a gellation product, drying the gellation product for having a compact having a three dimensional mesh-like skeleton structure with a large number of substantially spherical adjacent cells communicating with each other via communication holes, and sintering or fireing the compact directly, or temporarily baking (calcinating) the same before sintering or fireing for obtaining a sintered or fired product, wherein the rim of each communication hole in the compact, the temporarily baked product or the sintered or fired product is eliminated chemically.

Moreover, a third aspect of a production method for a ceramic porous material is a production method for a ceramic porous material comprising the steps of preparing a bubble-like slurry by mixing and whipping a ceramic powder, a liquid medium, a dispersing agent if necessary, a forming agent and a gellation main agent, adding and mixing a gellation sub agent to the bubble-like slurry, pouring into a mold for obtaining a gellation product, drying the gellation product for having a compact having a three dimensional mesh-like skeleton structure with a large number of substantially spherical adjacent cells communicating with each other via communication holes, and sinterd or fired the compact directly, or temporarily baking calcinating the same before sintering or fireing for obtaining a sintered or fired product, wherein the evaporation-condensation mechanism with respect to the crystal particles at the rim of each communication hole is promoted during the sintering or fireing operation of the compact or the temporarily baked product, or the re-sintering or re-fireing operation of the sintered or fired product. In addition, in the above-mentioned three methods, the dispersing agent is used when a large-sized product is manufactured, and otherwise it is omissible.

According to the above-mentioned ceramic porous material, the crystal particle size in the entire skeleton structure can be even.

It is preferable that the skeleton structure itself includes only the closed cells or it has substantially no cells.

As the ceramic for forming the skeleton structure, alumina, alumina-silica, calcium phosphate based substance, silicon carbide, zirconia, or the like can be used.

In contrast, according to the first aspect of the production method for a ceramic porous material, the abnormal part at the rim of each communication hole can be eliminated so that the hole size of the communication holes is made larger. The mechanical elimination of the rim of each communication hole can be executed by permeating a liquid such as water or a gel such as an agar with a hard fine particle such as a diamond powder and a silicon carbide powder dispersed through the compact, the temporarily baked product, or the sintered or fired product. Although the elimination of the rim of each communication hole can be executed also to the sintered or fired product, it is more efficient to execute the same to the temporarily baked product with a low strength, and in the case of executing the same to the compact, a liquid medium not to dissolve the compact is used.

The permeating operation of the liquid or the gel with the hard fine particle dispersed through the compact, the temporarily baked product or the sintered or fired product can be executed either from one direction or from multiple directions.

It is necessary that the hard fine particle, or the like does not remain in the temporarily baked product or the sintered or fired product after elimination of the rim of each communication hole. Therefore, it is preferable that the hard fine particle has a particle size larger than the cell diameter in the skeleton structure (gap between the primary particles) because the hard fine particle is in a state stuck between the primary particles in the skeleton structure in the case they have the substantially same size.

According to the second aspect of the production method for a ceramic porous material, similar to the case of the first aspect, the abnormal part at the rim of each communication hole can be eliminated so that the hole size of the communication holes is made larger.

The chemical elimination of the rim of each communication hole can be executed by soaking the temporarily baked product or the sintered or fired product in phosphoric acid or sulfuric acid, or the like, or dissolution at a high temperature by a sodium borate fused salt.

This is because the abnormal part unstable in terms of shape has a larger dissolution speed than that of the other parts. It is also possible to promote the dissolution speed by heating and pressuring the phosphoric acid (pressuring the phosphoric acid is dangerous) or the sulfuric acid at the time of the soaking operation.

Moreover, according to the third aspect of the production method for a ceramic porous material, the crystal particle size at the rim of each communication hole can be equivalent to the crystal particle size of the other parts.

The evaporation is carried out selectively quickly at a part with a high potential, that is, in the abnormal part, and the condensation is carried out selectively at a part with a low potential, that is, in the recessed part.

The sintering, fireing, re-sintering, or re-fireing or re-baking operation is carried out at a high temperature of 1,800° C. or higher in a hydrogen gas atmosphere or in a vacuum atmosphere, or in an atmosphere containing a halogen of a chlorine. According to the atmospheres, the evaporation-condensation mechanism promotion temperature is lowered by production of a volatile compound.

BRIEF DESCRIPTION OF THE DRAWINGS

FIG. 1 is an electron microscope photograph showing the crystal structure of an alumina ceramic porous material baked at 1,200° C. for 2 hours in the air without the mechanical process or the like.

DETAILED DESCRIPTION OF THE INVENTION

Figure 1:
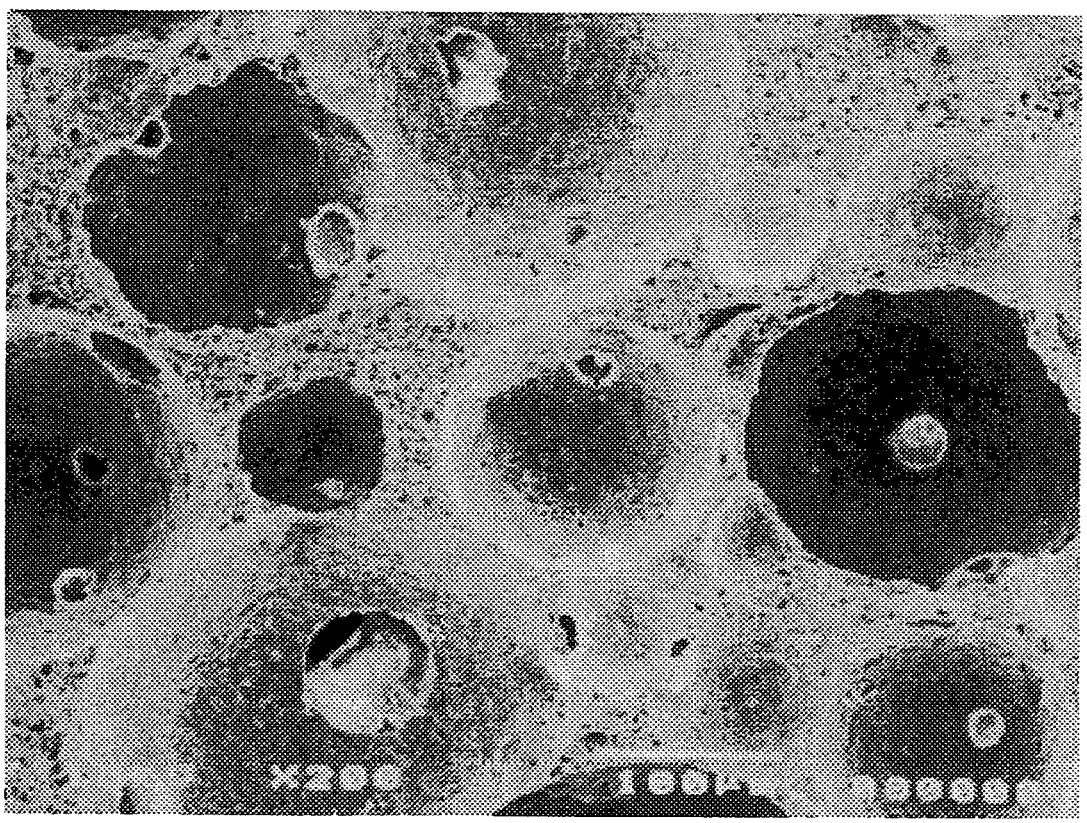

Hereinafter, embodiments of the present invention will be explained with reference to specific examples and comparative examples.

EXAMPLES 1 TO 5, COMPARATIVE EXAMPLE 1

First, a bubble-like slurry was prepared by mixing and agitating 100 parts by weight of a low soda alumina having a 1 μm average particle size as the ceramic powder, 20 parts by weight of ion exchange water as the liquid medium, 1 part by weight of an ammonium polyacrylate as the dispersing agent, 0.5 part by weight of a triethanol amine lauryl sulfate as the foaming agent, and 4 parts by weight of an epoxy resin as the gellation main agent by an agitator while introducing the air.

Next, while agitating the bubble-like slurry, 1 part by weight of an iminobispropyl amine as the gellation sub agent was added thereto. After pouring the same in a mold and passage of 30 minutes, the gellation proceeded sufficiently so as to obtain a gellation product.

Then, the gellation product was taken out from the mold and dried at 60° C. for whole day and night so as to obtain a compact (dried product).

The obtained compact has a three-dimensional mesh-like skeleton structure with a large number of substantially spherical adjacent cells communicating with each other via communication holes.

Next, the compact was heated (temporarily baked) at 1,200° C. for 2 hours in the air so as to obtain a temporarily baked product. It was processed with a diamond grinding-stone so as to obtain 6 pieces of columnar temporarily baked product with a 50 mm diameter and a 100 mm length.

In contrast, a cube-like test piece of a 2 mm side size was cut out from a part of the temporarily baked product and observed with an electron microscope. It was found that the alumina crystal particles of the part except the rim of the communication holes in the skeleton structure were grown up to about 1.5 μm, while those of the part of the rim of the communication holes in the skeleton structure were grown up to about 1.0 μm.

Moreover, the cell distribution was measured with a mercury pressure penetrated porosimeter so as to find peaks at 0.3 μm and 50 to 100 μm. As a result, it is learned that the gap between the alumina primary particles is 0.3 μm and the cell diameter is 50 to 100 μm, and the minimum size of the communication hole is about 20 μm.

Next, 50 parts by weight of a silicon carbide powder having a 5 μm average particle size, 50 parts by weight of ion exchange water and 0.1 part by weight of an ammonium polyacrylate as the dispersing agent were mixed so as to prepare a slurry. The slurry was sent with pressure at 30 cm/second flow rate by a pump comprising a circulation system for permeating 5 pieces of the columnar temporarily baked product therewith from the longitudinal direction for 10 minutes, 1 hour, 2 hours, 5 hours and 10 hours (examples 1 to 5). In contrast, the remaining one piece was provided as the temporarily baked product without permeation with the slurry (comparative example 1).

The 5 pieces of the temporarily baked product with the slurry permeation were washed sufficiently with ion exchange water for eliminating the silicon carbide powder. After drying at 120° C. for 1 hour, including the temporarily baked product without the slurry permeation, they were fired at 1,600° C. for 2 hours in the air so as to obtain the fired products and obtain 6 pieces of alumina ceramic porous materials.

The average cell size of each of the obtained alumina ceramic porous materials was 150 μm. Moreover, the porosity, the existence or absence of the abnormal part, the condensation strength, the pressure loss and the time to the particle number zero count were as shown in the table 1.

As to the existence or absence of the abnormal part, a cube-like test piece of a 2 mm side size was cut out form each alumina ceramic porous material and taking a scanning type electron microscope photograph thereof for observing the rim of the communication holes communicating the cells at a high magnification ratio of about 5,000 times. Thereby, whether or not the crystal particle growth was restrained compared with the other parts of the skeleton structure was observed, and furthermore, the existence or absence of the abnormality such as the cactus-like shape was observed.

As to the condensation strength, a short columnar-like shaped test piece of a 10 mm diameter and a 10 mm height was cut out from each alumina ceramic porous material with a diamond tool, and after a drying operation, the condensation strength was measured.

Moreover, as to the time to the particle number zero count, after washing the above-mentioned test pieces sufficiently with ion exchange water, time until elimination of dust generation was measured with a particle counter while applying the shock.

TABLE 1

| | porosity (%) | existence or absence of the abnormal part | condensation strength (MPa) | pressure loss (KPa) | time to the particle number zero count (minute) |
| --- | --- | --- | --- | --- | --- |
| example 1 | 60.2 | exist | 350 | 0.9 | 5 |
| example 2 | 61 | absent | 420 | 0.6 | 0.5 |
| example 3 | 62 | absent | 400 | 0.45 | 0.4 |
| example 4 | 65 | absent | 400 | 0.3 | 0.3 |
| example 5 | 70 | absent | 380 | 0.2 | 0.2 |
| Comparative example 1 | 60 | exist | 300 | 0.1 | 60 |

As it is shown in the table 1, in the case the abnormal part at the rim of communication holes is eliminated by applying the mechanical process, the porosity and the mechanical strength are made higher as well as the transmission resistance is made dramatically smaller according to the enlargement of the communication hole diameter accompanying the elimination of the abnormal part, and the particle generation was substantially eliminated.

EXAMPLES 6 TO 10

First, with reference to the examples 1 to 5, 5 compact pieces were produced with different porosities in the substantially same manner therewith. The compacts were temporarily baked so as to obtain columnar-shaped compacts. After the elimination process by permeation with the silicon carbide slurry, they were made to have the same porosity.

Next, in the same manner as in the examples 1 to 5, the temporarily baked products were fired for providing the fired products so as to obtain 5 pieces of alumina ceramic porous materials of a 60% porosity.

The porosity of the obtained alumina ceramic porous materials, the existence or absence of the abnormal part, the pressure loss and the time to the particle number zero count were measured in the same manner as in the examples 1 to 5. Results are shown in the table 2 together with those of the comparative example 1.

TABLE 2

| | porosity (%) | existence or absence of the abnormal part | condensation strength (MPa) | pressure loss (KPa) | time to the particle number zero count (minute) |
| --- | --- | --- | --- | --- | --- |
| example 6 | 60 | exist | 350 | 0.9 | 5 |
| example 7 | 60 | absent | 550 | 0.8 | 2 |
| example 8 | 60 | absent | 600 | 0.7 | 1 |
| example 9 | 60 | absent | 800 | 0.6 | 0.5 |
| example 10 | 60 | absent | 1000 | 0.5 | 0.2 |
| Comparative example 1 | 60 | exist | 300 | 1 | 60 |

As it is shown in the table 2, in the case the abnormal part with a small crystal particles at the rim of the communication holes is eliminated by applying the mechanical process so as to have the crystal particle size at the rim of the communication holes substantially equivalent to the crystal particle size in the other parts of the skeletons structure, the mechanical strength of the alumina ceramic porous materials of the same cell size and the porosity can dramatically be improved.

The air transmission amount and the pressure loss of the alumina ceramic porous material were measured so as to confirm the pressure loss inversely proportional to the square value of the average value of the communication hole size.

EXAMPLES 11 TO 15, COMPARATIVE EXAMPLE 2

First, a bubble-like slurry was prepared by mixing and agitating 100 parts by weight of a silicon carbide powder having a 0.5 μm average particle size as the ceramic powder, 40 parts by weight of ion exchange water as, the liquid medium, 1.0 parts by weight of a triethanol amine lauryl sulfate as the foaming agent, 2 parts by weight of a carbon black having a 260 m²/g specific surface area and 0.5 part by weight of a boron carbide having a 1.6 μm average particle size as the sintering auxiliary agent, and 6 parts by weight of a polyethylene imine as the gellation main agent by an agitator while introducing the air.

Next, while agitating the bubble-like slurry, 2 parts by weight of an epoxy resin as the gellation sub agent was added thereto. After pouring the same in a mold and passage of 30 minutes, the gellation proceeded sufficiently so as to obtain a gellation product.

Then, the gellation product was taken out from the mold and dried at 60° C. for whole day and night so as to obtain a compact (dried product).

The obtained compact has a three-dimensional mesh-like skeleton structure with a large number of substantially spherical adjacent cells communicating with each other via communication holes.

Next, the compact was heated (temporarily baked) at 1,800° C. for 1 hour in an argon gas atmosphere so as to obtain a temporarily baked product. It was processed with a diamond grindingstone so as to obtain 6 pieces of columnar temporarily baked product with a 50 mm diameter and a 100 mm length.

In contrast, a rectangular parallelopiped-like test piece of a 5 mm longitudinal size, a 5 mm lateral size and a 10 mm length was cut out from a part of the temporarily baked product and the cell distribution was measured with a mercury pressure penetrated porosimeter so as to find peaks at 0.02 μm, 0.2 μm, and 10 μm.

Next, as in the examples 1 to 5, 50 parts by weight of a silicon carbide powder having a 5 μm average particle size, 50 parts by weight of ion exchange water and 0.1 part by weight of an ammonium polyacrylate as the dispersing agent were mixed so as to prepare a slurry. The slurry was sent with pressure at 30 cm/second flow rate by a pump comprising a circulation system for permeating 5 pieces of the columnar temporarily baked product therewith from the longitudinal direction for 10 minutes, 1 hour, 2 hours, 5 hours and 10 hours (examples 11 to 15). In contrast, the remaining one piece was provided as the temporarily baked product without permeation with the slurry (comparative example 2).

As in the examples 1 to 5, the 5 pieces of the temporarily baked product with the slurry permeation were washed sufficiently with ion exchange water for eliminating the silicon carbide powder. After drying at 120° C. for 1 hour, including the temporarily baked product without the slurry permeation, they were sintered at 2,200° C. for 1 hours in an argon gas atmosphere so as to obtain the baked products and obtain 6 pieces of silicon carbide ceramic porous materials.

The average cell size of each of the obtained silicon carbide ceramic porous materials was 100 μm. Moreover, the porosity, the existence or absence of the abnormal part, the condensation strength, the pressure loss and the time to the particle number zero count were measured as in the examples 1 to 5. Results are shown in the table 3.

TABLE 3

|  | porosity (%) | existence or absence of the abnormal part | condensation strength (MPa) | pressure loss (KPa) | time to the particle number zero count (minute) |
| --- | --- | --- | --- | --- | --- |
| example 11 | 55.2 | exist | 520 | 1.1 | 5 |
| example 12 | 56 | absent | 800 | 0.8 | 0.3 |
| example 13 | 57 | absent | 900 | 0.65 | 0.2 |
| example 14 | 60 | absent | 1000 | 0.4 | 0.1 |
| example 15 | 64 | absent | 950 | 0.3 | 0.1 |
| Comparative example 2 | 55 | exist | 500 | 1.2 | 75 |

As it is shown in the table 3, in the case the abnormal part at the rim of communication holes is eliminated by applying the mechanical process, the porosity and the mechanical strength are made higher as well as the transmission resistance is made dramatically smaller according to the enlargement of the communication hole diameter accompanying the elimination of the abnormal part, and the particle generation was substantially eliminated.

EXAMPLE 16

First, the alumina ceramic porous material of the comparative example 1 was processed into a rectangular parallelepiped-like shape of a 1 cm square and a 10 cm length. A slurry with a sodium borate powder dispersed by 30% in an acetone was poured thereon for introducing the sodium borate slurry into the cells of the alumina ceramic porous material.

Next, after dying the acetone, it was introduced into a furnace kept at 1,000° C. for fusing the sodium borate. After maintaining the same in the furnace for 10 minutes, it was taken out from the furnace and cooled down in the air. Then, it was boiled in a diluted hydrochloric acid for 2 hours for dissolving and eliminating the sodium borate so as to obtain an alumina ceramic porous material.

The porosity, the existence or absence of the abnormal part, the condensation strength, the pressure loss and the time to the particle number zero count were measured as in the examples 1 to 5. Results are shown in the table 4 together with those of the comparative example 1.

TABLE 4

|  | porosity (%) | existence or absence of the abnormal part | condensation strength (MPa) | pressure loss (KPa) | time to the particle number zero count (minute) |
| --- | --- | --- | --- | --- | --- |
| example 16 | 75 | absent | 500 | 0.1 | 0.1 |
| Comparative example 1 | 60 | exist | 300 | 1 | 60 |

As it is shown in the table 4, by eliminating the abnormal part by applying the chemical process, the porosity and the mechanical strength are made higher as well as the particle generation is eliminated, and the transmission resistance is made smaller.

EXAMPLES 17, 18

The temporarily baked product of the comparative example 1 and the fired product of the comparative example 1 were fired or re-fired at 1,900° C. in a hydrogen gas atmosphere for 5 hours for providing a baked product or a re-baked product so as to obtain an alumina ceramic porous material, respectively. The crystal particles of both of the obtained ceramic porous materials had grain growth to about 20 μm. Moreover, the porosity, the existence or absence of the abnormal part, the condensation strength, the pressure loss and the time to the particle number zero count were measured as in the examples 1 to 5. Results are shown in the table 5 together with those of the comparative example 1.

TABLE 5

|  | porosity (%) | existence or absence of the abnormal part | condensation strength (MPa) | pressure loss (KPa) | time to the particle number zero count (minute) |
|---|---|---|---|---|---|
| example 17 | 60 | Absent | 400 | 0.1 | 0.1 |
| example 18 | 60 | Absent | 400 | 0.1 | 0.1 |
| Comparative example 1 | 60 | Exist | 300 | 1 | 60 |

As it is shown in the table 5, by denaturing the abnormal part by processing the temporarily baked product or the fired product in a high temperature hydrogen gas so as to have the crystal particle size in the entire skeleton structure evenly, a high porosity and a high mechanical strength can be provided as well as the particle generation was eliminated, and the transmission resistance is made smaller.

The particle structure of the alumina ceramic porous material baked at 1,600° C. for 2 hours in the air without the mechanical process is as shown in FIG. 1. Moreover, the crystal structure of the above-mentioned alumina ceramic porous material after re-fireing at 1,840° C. for 10 hours in a hydrogen atmosphere is as shown in FIG. 2.

Figure 2:
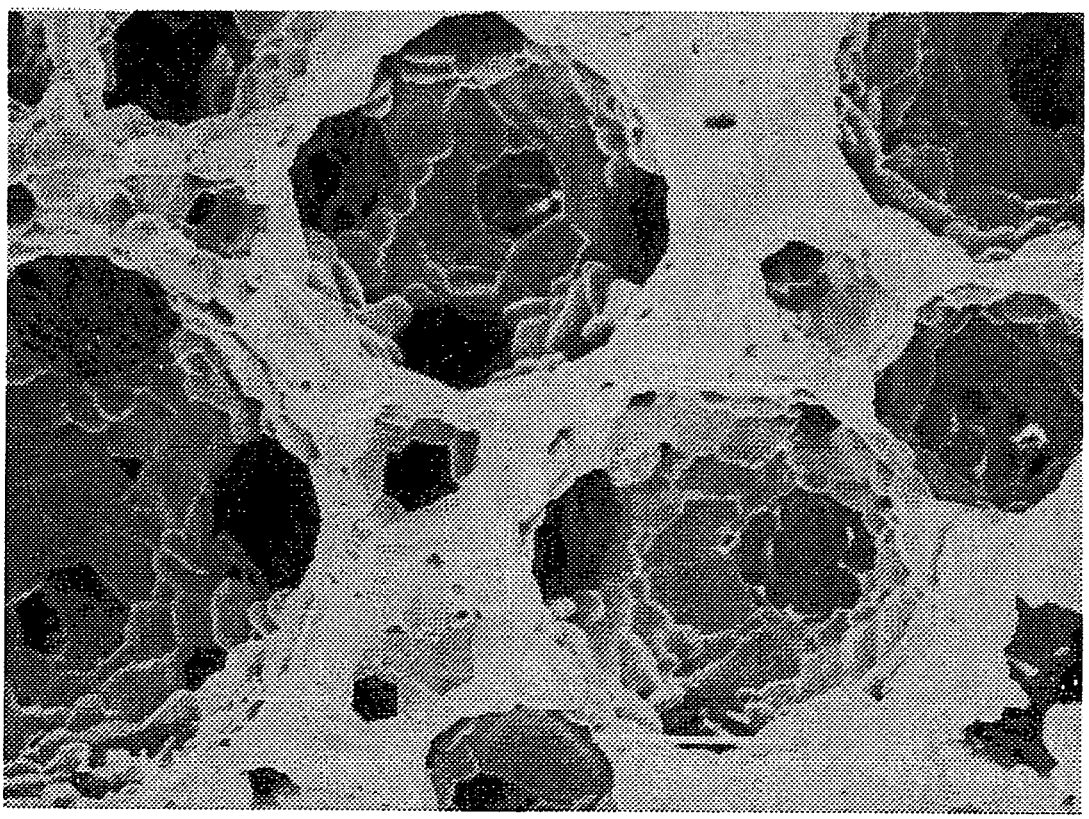
FIG. 2 is an electron microscope photograph showing the crystal structure of the alumina ceramic porous material of FIG. 1 after re-fireing at 1,840° C. for 10 hours in a hydrogen atmosphere.

As it is shown in the FIG. 2, by the process in the high temperature hydrogen gas, the entire crystal particle size is made substantially equivalent.

As heretofore explained, according to a ceramic porous material and a production method therefore of the present invention, since the entire crystal particle size of the skeleton structure can be even, to provide a ceramic porous material which has a high strength, though it has a high porosity, and which is excellent in permeability without dust generation.

What is claimed is:

1. A method for producing a ceramic porous material, comprising:
preparing a bubbly slurry by mixing and whipping a ceramic powder, a liquid medium, a forming agent and a gellation main agent, and optionally a dispersing agent,
adding and mixing a gellation sub agent to the bubbly slurry,
pouring the slurry into a mold to obtain a gellation product,
drying the gellation product to form a compact having a three dimensional network skeleton structure with a large number of substantially spherical adjacent cells communicating with each other via communication holes,
sintering or firing the compact directly to obtain a sintered or fired product, or temporarily baking (calcinating) the compact and then sintering and firing the same to obtain a sintered or fired product,
wherein a rim of each communication hole in the compact, the temporarily baked product or the sintered or fired product is eliminated mechanically;
wherein said rim of each communication hole is eliminated by permeating a liquid or a gel with a hard fine particle dispersed through the compact, the temporarily baked product, or the sintered or fired product.

2. The method according to claim 1, wherein said liquid is water.

3. The method according to claim 1, wherein said gel is agar.

4. The method according to claim 1, wherein said hard fine particle is a diamond powder or a silicon carbide powder.

5. The method according to claim 1, wherein said ceramic powder is alumina, alumina-silica, a calcium phosphate based substance, silicon carbide or zirconia.

6. The method according to claim 1, wherein said gellation main agent is an epoxy resin.

7. The method according to claim 1, wherein said gellation sub agent is iminobispropyl amine.

8. A method for producing a ceramic porous material, comprising:
preparing a bubbly slurry by mixing and whipping a ceramic powder, a liquid medium, a forming agent and a gellation main agent, and optionally a dispersinci agent,
adding and mixing a gellation sub agent to the bubbly slurry,
pouring the slurry into a mold to obtain a gellation product,
drying the gellation product to form a compact having a three dimensional network skeleton structure with a large number of substantially spherical adjacent cells communicating with each other via communication holes, and
sintering or firing the compact directly to obtain a sintered or fired product, or temporarily baking (calcinating) the compact to obtain a sintered or fired product,
wherein a rim of each communication hole in the compact, the temporarily baked product or the sintered or fired product is eliminated chemically;
wherein said rim of each communication hole is eliminated by soaking the temporarily baked product or the sintered or fired product in phosphoric acid or sulfuric acid, or by dissolution at a high temperature by a sodium borate fused salt.

9. The method according to claim 8, wherein said ceramic powder is alumina, alumina-silica, a calcium phosphate based substance, silicon carbide or zirconia.

10. A method for producing a ceramic porous material, comprising:
preparing a bubbly slurry by mixing and whipping a ceramic powder, a liquid medium, a forming agent and a gellation main agent, and optionally a dispersing agent,
adding and mixing a gellation sub agent to the bubbly slurry,
pouring the slurry into a mold to obtain a gellation product,
drying the gellation product to form a Compact having a three dimensional network skeleton structure with a large number of substantially spherical adiacent cells communicating with each other via communication holes, and sintering or firing the compact directly to obtain a sintered or fired product, or temporarily baking (calcinating) the compact to obtain a sintered or fired product, wherein an evaporation-condensation mechanism with respect to the crystal particles at a rim of each communication hole is promoted during the sintering or firing operation of the compact or the temporarily baked product, or a re-sintering or re-firing operation of the sintered or fired product;

wherein the sintering, firing, re-sintering, or re-firing, or re-baking is carried out at 1,8000° C. or higher in a hydrogen atmosphere or a vacuum atmosphere or an atmosphere containing a halogen.

11. The method according to claim 10, wherein the sintering, firing, re-sintering, or re-firing, or re-baking is carried out in a hydrogen atmosphere.

12. The method according to claim 10, wherein said ceramic powder is alumina, alumina-silica, a calcium phosphate based substance, silicon carbide or zirconia.

13. The method according to claim 10, wherein a crystal particle size at the rim of each communication hole is equivalent to a crystal particle size of remaining parts of the ceramic porous material.

14. A method for producing a ceramic porous material, comprising:

preparing a bubbly slurry by mixing and whipping a ceramic powder, a liquid medium, a forming agent and a gellation main agent, and optionally a dispersing agent, adding and mixing a gellation sub agent to the bubbly slurry, pouring the slurry into a mold to obtain a gellation product, drying the gellation product to form a compact having a three dimensional network skeleton structure with a large number of substantially spherical adjacent cells communicating with each other via communication holes, and sintering or firing the compact directly to obtain a sintered or fired product, or temporarily baking (calcinating) the compact to obtain a sintered or fired product, wherein an evaporation-condensation mechanism with respect to the crystal particles at a rim of each communication hole is promoted during the sintering or firing operation of the compact or the temporarily baked product, or a re-sintering or re-firing operation of the sintered or fired product;

wherein said rim of each communication hole is eliminated by permeating water with diamond powder dispersed through the compact, the temporarily baked product, or the sintered or fired product.

* * * * *